United States Patent
Holmes et al.

(10) Patent No.: US 8,512,189 B2
(45) Date of Patent: Aug. 20, 2013

(54) HYBRID POWERTRAIN WITH COMPOUND-SPLIT EVT DRIVE AXLE AND ELECTRIC DRIVE AXLE

(75) Inventors: Alan G. Holmes, Clarkston, MI (US); Shawn H. Swales, Canton, MI (US); Norman Schoenek, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/309,838

(22) Filed: Dec. 2, 2011

(65) Prior Publication Data
US 2013/0143706 A1 Jun. 6, 2013

(51) Int. Cl.
*F16H 3/72* (2006.01)

(52) U.S. Cl.
USPC .............................................. 475/5; 475/151

(58) Field of Classification Search
None
See application file for complete search history.

(56) References Cited

U.S. PATENT DOCUMENTS 6,371,878 B1 * 4/2002 Bowen .............................. 475/5
7,395,889 B2 * 7/2008 Sugiyama et al. ........ 180/65.285

* cited by examiner

*Primary Examiner* — Erin D Bishop
(74) *Attorney, Agent, or Firm* — Quinn Law Group, PLLC

(57) ABSTRACT

A hybrid powertrain is provided for a vehicle that has a first axle and a second axle. The hybrid powertrain includes an engine, a stationary member, and an electrically-variable transmission that has a first and a second interconnected planetary gear set and a first and a second motor/generator. The engine, the first motor/generator, the second motor/generator and the first axle are each operatively connectable for rotation with a different member of the first and the second planetary gear sets. The powertrain has an electric drive unit that has reduction gearing and a third motor/generator. The third motor/generator and the second axle are each operatively connected to a different member of the third planetary gear set. The powertrain is operable in a compound-split operating mode.

15 Claims, 2 Drawing Sheets

HYBRID POWERTRAIN WITH COMPOUND-SPLIT EVT DRIVE AXLE AND ELECTRIC DRIVE AXLE

TECHNICAL FIELD

The invention relates to a hybrid powertrain having a compound-split operating mode.

BACKGROUND

Hybrid electric vehicles offer reduced fuel consumption and emissions by utilizing one or more electric motor/generators, an internal combustion engine, and an onboard controller programmed to vary use of each of the engine and motor/generator(s) during different driving conditions to achieve peak efficiency.

Powertrains with an electrically-variable transmission typically have an input member, an output member, and two electric motor/generators connected to different members of planetary gear sets. Engagement of torque-transmitting mechanisms may allow one or more electrically-variable modes of operation, fixed speed ratio modes, and an electric-only (battery-powered) mode. Electrically-variable transmissions may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate inefficient engine operation and engine friction losses. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand. For example, an EVT may be configured in an input-split mode, in which one motor-generator is connected through gearing only to the output, and functions as a motor at low speed; a second motor generator is connected through gearing to both the input and the output, and functions as a generator at low speeds. An EVT may be configured in a compound-split mode, wherein both the first and second motor-generator are connected through gearing to both the input and output.

SUMMARY

A hybrid powertrain is provided for a vehicle that has a first axle and a second axle. One of the axles is a front axle and the other of the axles is a rear axle. The hybrid powertrain includes an engine, a stationary member, an electrically-variable transmission and an electric drive unit.

The electrically-variable transmission has a first and a second interconnected planetary gear set and a first and a second motor/generator. The engine, the first motor/generator, the second motor/generator and the first axle are each operatively connectable for rotation with a different member of the first or the second planetary gear set.

The electric drive unit has reduction gearing and a third motor/generator. Reduction gearing reduces the speed and multiplies the torque from an electric motor to an axle, so that the speed of the electric motor and the average speed of the wheels coupled to that axle are proportional to one another. Reduction gearing may include one or more pairs of meshing gears, one or more sets of planetary gears, or a combination thereof. The third motor/generator and the second axle are each operatively connected to a different member of the reduction gearing in the electric drive unit. The reduction gearing may be a third planetary gear set, in which case a member of the third planetary gear set is connectable to the stationary member.

The powertrain is operable in a compound-split operating mode with the engine on and one of the first motor/generator and the second motor/generator functioning as a generator to power the other one of the first motor/generator and the second motor/generator, which functions as a motor, so that the first axle is a drive axle.

The powertrain may be operable in an input-split operating mode with the engine on and one of the first motor/generator and the second motor/generator functioning as a generator to power the third motor/generator which functions as a motor so that the second axle is a drive axle. The transition between the input-split operating mode and the compound-split operating mode occurs without active clutches or shifting. An all-wheel drive mode may be established with the engine on and one of the first motor/generator and the second motor/generator functioning as a generator to power both the other one of the first motor/generator and the second motor/generator and the third motor/generator to function as motors so that both the first axle and the second axle are drive axles.

Optionally, a disconnect clutch may be used to allow the electric drive unit on the second axle to freewheel during the compound-split operating mode to reduce drag losses. Also, an input brake, such as a one-way braking clutch or a selectively engageable braking clutch, may be used to hold the engine crankshaft and the input member of the electrically-variable transmission stationary to allow an electric-only operating mode powered by both of the motor/generators of the electrically-variable transmission functioning as motors, and to allow a regenerative braking mode in which both of the motor/generators of the electrically-variable transmission function as generators.

The above features and advantages and other features and advantages of the present invention are readily apparent from the following detailed description of the best modes for carrying out the invention when taken in connection with the accompanying drawings.

DETAILED DESCRIPTION

Figure 1:
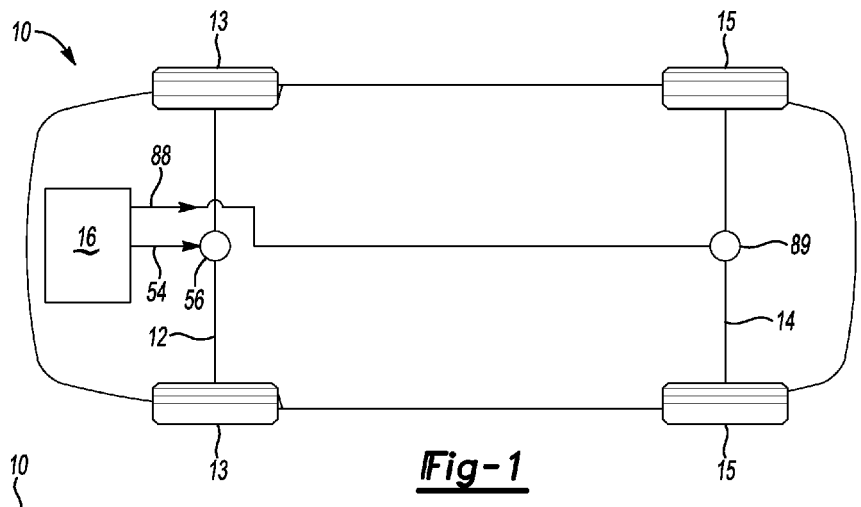
FIG. 1 is a schematic illustration of a vehicle having a powertrain operatively connected to a first axle and a second axle.

Referring to the drawings, wherein like reference numbers refer to like components throughout the several views, FIG. 1 shows a vehicle 10 that has a first axle 12 and a second axle 14. In the embodiment shown, the first axle 12 is a front axle for driving front wheels 13 and the second axle 14 is a rear axle for driving rear wheels 15. The vehicle 10 has a powertrain 16 that has different components to separately drive the first axle 12 and the second axle 14 to provide efficient operating modes for different operating conditions with low content requirements. For example, an input-split operating mode and a compound-split operating mode are provided, with no shifting or active clutches necessary for transitioning between the two modes. An all-wheel drive operating mode, a two-motor electric-only operating mode, a two-motor regenerative braking mode, and other operating modes are also available.

Figure 2:
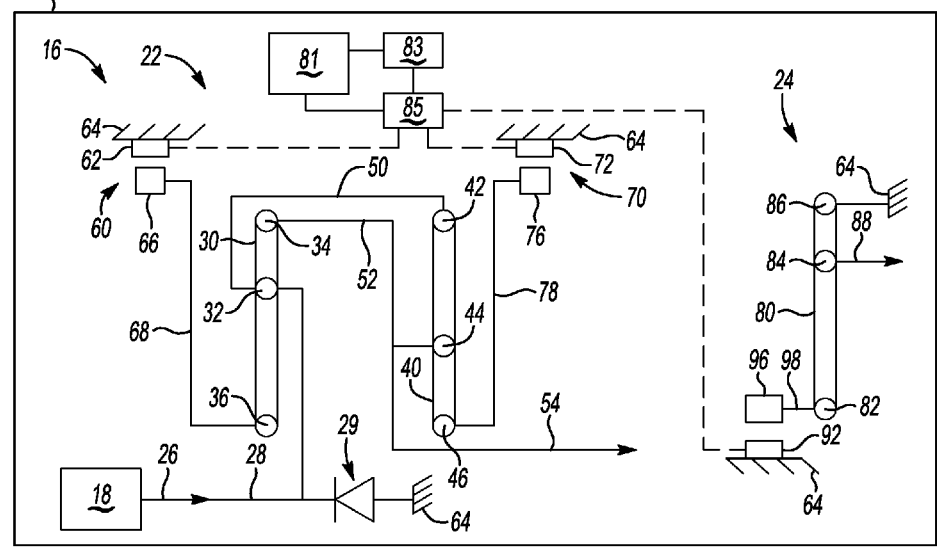
FIG. 2 is a schematic illustration of the powertrain of FIG. 1 showing an engine and electrically-variable transmission shown in lever diagram form connected to the first axle and an electric drive unit shown in lever diagram form connected to the second axle.

FIG. 2 shows a first embodiment of the powertrain 16 that includes an engine 18 and an electrically-variable transmission (EVT) 22 operatively connected to the first axle 12 of FIG. 1, and an electric drive unit 24 operatively connected to the second axle 14 of FIG. 1 as described below. The engine 18 has a crankshaft 26 operatively connected to rotate with an input member 28 of the EVT 22. An optional one-way braking clutch 29, referred to as an input brake or engine brake, is operatively connected to the input member 28 and overruns when the engine crankshaft 26 and input member 28 rotate in a forward direction, but brakes to ground the input member 28 and the crankshaft 26 to a stationary member 64 when torque in the opposite (reverse) direction of rotation is applied to the input member 28, such as when the first member 32 of the first planetary gear set 30 is urged to rotate in a direction opposite that of the engine crankshaft 26. The stationary member 64 may be a transmission housing.

The EVT 22 includes a first planetary gear set 30 that has a first member 32, a second member 34 and a third member 36. The first, second and third members 32, 24, 36 are, in any order, a sun gear member, a ring gear member, and a carrier member that supports pinion gears that mesh with both the sun gear member and the ring gear member of the first planetary gear set 30.

The EVT 22 also includes a second planetary gear set 40 that has a first member 42, a second member 44 and a third member 46. The first, second and third members 42, 44, 46 are, in any order, a sun gear member, a ring gear member, and a carrier member that supports pinion gears that mesh with both the sun gear member and the ring gear member of the second planetary gear set 40.

A first interconnecting member 50 connects the first member 32 of the first planetary gear set 30 for common rotation with the first member 42 of the second planetary gear set 40. A second interconnecting member 52 connects the second member 34 of the first planetary gear set 30 for rotation at the same speed as the second member 44 of the second planetary gear set 40. An output member 54 of the EVT 22 is also connected for common rotation with the interconnecting member 52, and is operatively connected to and drives the first axle 12 through a differential 56, as shown in FIG. 1. As used herein, components that are connected for "common rotation" rotate at the same speed because they are rigidly interconnected.

The EVT 22 includes a first motor/generator 60 that has a stator 62 mounted to the stationary member 64. The first motor/generator 60 has a rotor 66 supported on a rotor hub 68 that is connected to and rotates at the same speed as the third member 36 of the first planetary gear set 30.

The EVT 22 includes a second motor/generator 70 that has a stator 72 mounted to the stationary member 64, and a rotor 76 supported on a rotor hub 78 that is connected to and rotates at the same speed as the third member 46 of the second planetary gear set 40.

The motor/generators 60, 70 may be electric motor/generators that are powered by an energy storage device 81, such as a battery, under the control of a controller 83. The controller 83 provides energy from the battery 81 through a power inverter 85 to one or both stators 62, 72 when the motor/generator 60 or 70 is controlled to function as a motor, or receives energy from one or both motor/generators 60, 70 through the power inverter 85 when the motor/generator 60 or 70 is controlled to function as a generator.

The electric drive unit 24 includes reduction gearing, which in this embodiment is a third planetary gear set 80 that has a first member 82, a second member 84 and a third member 86. The first, second and third members 82, 84, 86 are, in any order, a sun gear member, a ring gear member, and a carrier member that supports pinion gears that mesh with both the sun gear member and the ring gear member of the third planetary gear set 80. The third member 86 is permanently grounded to the stationary member 64 in this embodiment, and so does not rotate. An output member 88 of the electric drive unit 24 is connected for common rotation with the second member 84, and is operatively connected to and drives the second axle 14 through a differential 89, as shown in FIG. 1.

The electric drive unit 24 includes a third motor/generator 90 that has a stator 92 mounted to the stationary member 64. The third motor/generator 90 has a rotor 96 supported on a rotor hub 98 that is connected to and rotates at the same speed as the first member 82 of the third planetary gear set 80. The third motor/generator 90 may be an electric motor/generator that is powered by the energy storage device 81 under the control of the controller 83, which provides energy from the battery 81 through the power inverter 85 to the stator 92 when the motor/generator 90 is controlled to function as a motor, or receives energy from the motor/generator 90 through the power inverter 85 when the motor/generator 90 is controlled to function as a generator.

By providing both the EVT 22 connected for driving the first axle 12 and the electric drive unit 24 connected for driving the second axle 14, efficient operating modes are available for a variety of operating conditions.

The powertrain 16 may be controlled to establish an input-split operating mode to launch the vehicle 10, and for low speed operation of the vehicle 10. The input-split operating mode is established when the engine 18 is on and the first motor/generator 60 is controlled to function as a generator to provide power to the third motor/generator 90, which is controlled to function as a motor. The second motor/generator 70 is not powered. Alternatively, the second motor/generator 70 may function as a generator to provide power to the third motor/generator, and the first motor/generator 60 may not be powered.

Figure 3:
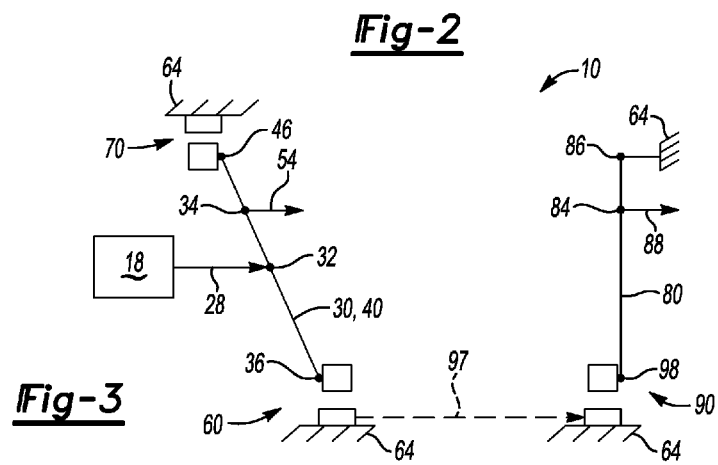
FIG. 3 is a schematic illustration of powerflow in the powertrain of FIGS. 1 and 2 shown in lever diagram form during an input-split operating mode.

The input-split operating mode is schematically illustrated in FIG. 3, with the planetary gear sets 30, 40 collapsed in lever diagram form, as is understood by those skilled in the art. Arrow 97 represents power flow from the first motor/generator 60 to the third motor/generator 90 via the controller 83 and power inverter 85 (not shown in FIG. 3). The first planetary gear set 30 transmits torque from the engine 18 via the first member 32, to both the second member 34, which supplies torque to the output member 54 to drive the front axle 12 of FIG. 2, and the third member 36, which supplies torque and mechanical power to the first motor generator 60. Because the second motor/generator 70 is not powered, it freewheels, and the second planetary gear set 40 is inactive. The third planetary gear set 80 is active as the third member 86 is grounded, the first member 82 is powered by the motor/generator 90 and torque is provided at the output member 88 to drive the second axle 14 of FIG. 1. For embodiments in which the second axle 14 is a rear axle, it is advantageous to have drive power at the rear axle, as the weight of the vehicle 10 is transferred to the rear wheels 15 when accelerating at relatively low speeds.

A compound-split operating mode in which drive power is provided to the first axle 12 is established when the engine 18 is on, the first motor/generator 60 is controlled to function as a generator, the second motor/generator 70 is controlled to function as a motor, and the third motor/generator 90 is not powered. Alternatively, the second motor/generator 70 could be controlled to function as a generator and the first motor/generator 60 controlled to function as a motor. The compound-split operating mode is depicted schematically in lever diagram form in FIG. 4, with the planetary gear sets 30, 40 collapsed in lever diagram form, as is understood by those skilled in the art. Such a lever diagram, with four distinct members, may be drawn to represent two planetary gear sets interconnected various different ways, including two incomplete planetary gear sets with intermeshing planet gears and a common carrier, as is understood by those skilled in the art. In the compound-split operating mode, the input member 28, the output member 54, the rotor 36 of the first motor/generator 60, and the rotor 46 of the second motor/generator 70 may each be rotating at different speeds. All of these members are depicted as rotating at the same speed in the example show in FIG. 4, which is a condition for maximum power flow from the first motor/generator 60 to the second motor/generator 70. Arrow 99 represents power flow from the first motor/generator 60 to the second motor/generator 70 via the controller 83 and power inverter 85 (not shown in FIG. 4). Because the third motor/generator 90 is not powered, it freewheels, and the third planetary gear set 80 is inactive, with no torque provided to the output member 88 or the second axle 14 of FIG. 1. The first and second planetary gear sets 30, 40 are active as each of the members is connected for rotation with either the input member 28, the motor/generator 60 or 70, or the output member 54. Accordingly, torque is provided at the output member 54 to drive the first axle 12 of FIG. 1.

The input-split operating mode provides efficient launch and low-speed operation of the vehicle with an inherent distribution of torque to both of the axles, 12, 14. The compound-split operating mode provides efficient operation at higher vehicle speeds. The transition between the input-split operating mode and the compound-split operating mode occurs without the need for active clutches or shifting. The input-split operating mode uses only two motor/generators 60, 90, and the compound-split operating mode uses only two motor/generators 60, 70.

The motor/generators 60, 70, 90 can be controlled to operate in between the input-split operating mode and the compound-split operating mode to achieve maximum efficiency of the powertrain 16 under the vehicle driving conditions or to control torque split between the first axle 12 and the second axle 14. Optionally, the powertrain 10 may be controlled to provide an all-wheel drive operating mode if slip occurs at the driving wheels 13 or 15 while operating in the input-split mode or the compound-split operating mode or in between them, or if vehicle operating conditions or operator input otherwise indicate that all-wheel drive operation is desired.

Figure 4:
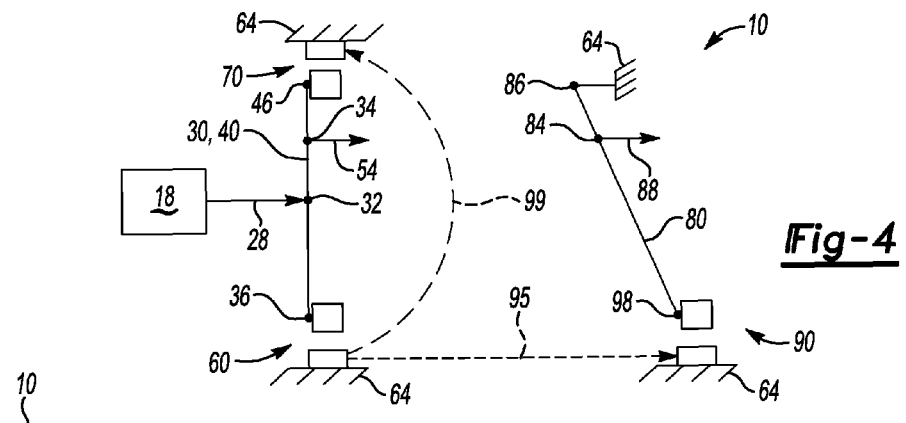
FIG. 4 is a schematic illustration of powerflow in the powertrain of FIGS. 1 and 2 shown in lever diagram form during a compound-split operating mode and an optional all-wheel drive mode.

Dotted arrow 95 in FIG. 4 indicates power flow from motor/generator 60 operating as a generator to motor/generator 90 operating as a motor via the controller 83 and power inverter 85 (not shown in FIG. 4) while the components of the EVT 22 remain operating as described with respect to the compound-split operating mode, sending drive power to the axle 12 of FIG. 1. The all-wheel drive mode is established with the engine 18 on and powerflow from the motor/generator 60 functioning as a generator to provide power to both the motor/generator 70 and the motor/generator 90 functioning as motors.

If the vehicle 10 is launched when in the input-split operating mode and the wheels 13 begin to slip, the first motor/generator 60 may continue to operate as a generator, but may provide some power to the second motor/generator 70 in order for the second motor/generator 70 to operate as a motor to prevent the third member 46 from reaching a zero speed, so that torque from the engine 18 does not cause the wheels 13 to spin. The third motor/generator 90 receives the remaining generated power from the first motor/generator 60 to operate as a motor, providing torque to the second axle 14 to launch the vehicle 10. The second motor/generator 70 thus reduces torque at the front axle 12 and increases torque at the second axle 14.

Furthermore, the input brake 29 enables operation in an electric-only operating mode, with the engine 18 off and both motor/generators 60, 70 controlled to function as motors to provide forward driving torque at the output member 54 and the first axle 12. Motor/generator 70 supplies torque in the forward direction to third member 46 and uses brake 29 to provide forward reaction torque to second member 32. Motor/generator 60 supplies torque in the opposite direction to third member 36 and uses brake 29 to provide forward reaction torque to second member 32. Motor/generator 90 is off during the two-motor electric-only operating mode. Another electric-only operating mode is established when the motor/generator 90 is controlled to function as a motor, using stored energy in the electric storage device 81, with both motor/generators 60, 70 off. The powertrain 16 can operate in a combination of these two modes for all-wheel drive during electric-only operation.

Because the electric drive unit 24 is not used during the compound-split operating mode, during the two-motor regenerative braking mode, or during the two-motor electric-only operating mode, optional design features may be provided to minimize losses that would otherwise occur due to drag of the electric drive unit 24 during these operating modes. For example, the third motor/generator 90 may be an induction motor or wound field motor instead of a permanent magnet motor. When electric power to the stator of an induction motor or a wound field motor is ceased, only a torque drag due to the rotating mass of the rotor is incurred. A permanent magnet motor, on the other hand, must be constantly fed electric power to overcome the reaction torque created by the rotating magnets or it will have a substantial drag caused by the magnets which will appear as an undesirable drag torque on the rear wheels 15. By using an induction motor or wound field motor for the third motor/generator 90, this constant power consumption of a permanent magnet motor is eliminated.

Figure 5:
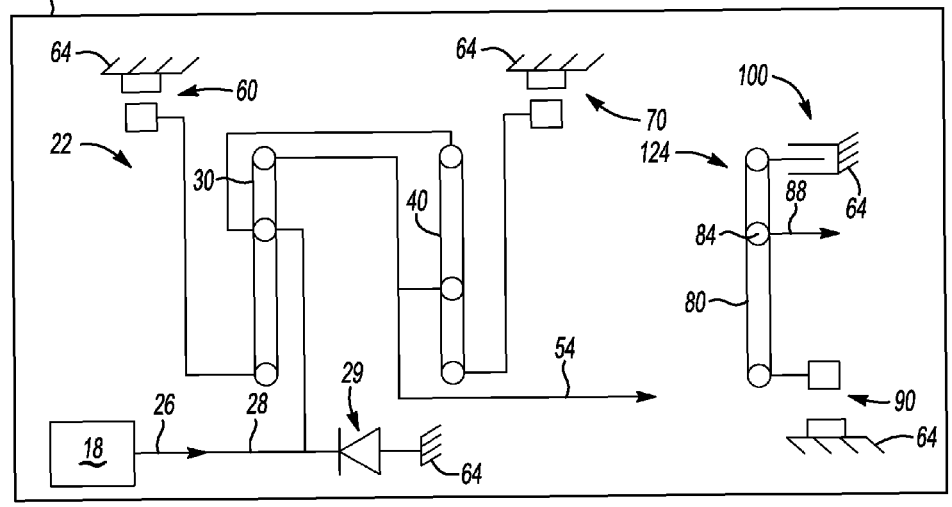
FIG. 5 is a schematic illustration of an alternative embodiment of a powertrain having an electrically-variable transmission shown in lever diagram form connected to the first axle and an electric drive unit shown in lever diagram form connected to the second axle, with a disconnect clutch on the electric drive unit and a one-way braking clutch on the engine.

Drag losses of the electric drive unit 24 of FIG. 2 can also be reduced by providing a disconnect clutch 100 on the third member 86 as shown on the alternative embodiment of an electric drive unit 124 in powertrain 116 of FIG. 5. The powertrain 116 has the same EVT 22 as described above, and the electric drive unit 124 is otherwise the same as electric drive unit 24. The powertrain 116 operates in like manner as the powertrain 16 to provide the same operating modes. The disconnect clutch 100 can be disengaged during the compound-split operating mode, the regenerative braking mode, and the two-motor electric-only operating mode to allow the components of the electric drive unit 124 to freewheel, reducing drag losses. The disconnect clutch 100 may be a friction plate clutch that is selectively engageable, such as by an electro-hydraulic control system. The powertrain 116 includes the energy storage device 81, controller 83 and power inverter 85 of FIG. 2, although not shown in FIG. 5 for simplicity in the drawings.

Figure 6:
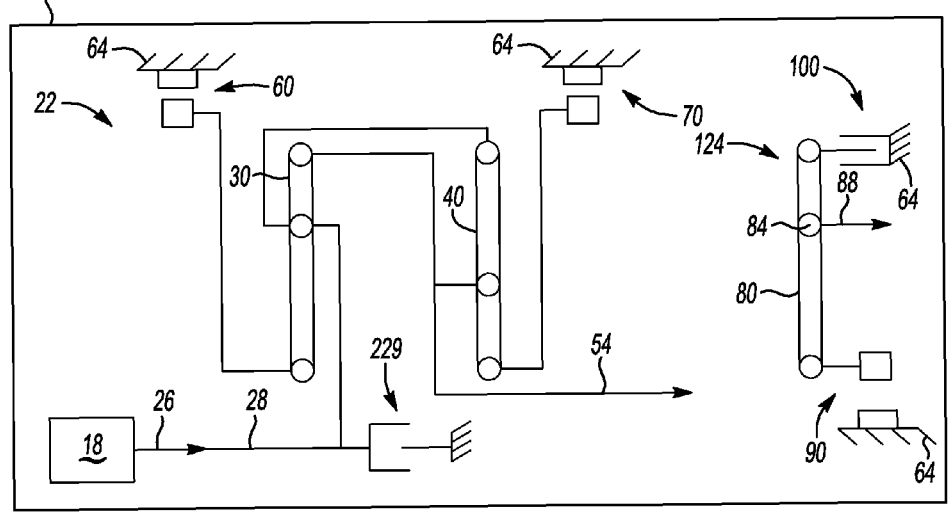
FIG. 6 is a schematic illustration of another alternative embodiment of a powertrain having an electrically-variable transmission shown in lever diagram form connected to the first axle and an electric drive unit shown in lever diagram form connected to the second axle, with a disconnect clutch on the electric drive unit and an engine brake.

FIG. 6 shows another embodiment of a powertrain 216 that is alike in all aspects to the powertrain 116 of FIG. 5, but has a selectively engageable input brake 229 rather than the passive one-way braking clutch 29 of FIGS. 2 and 5. Because the input brake 229 shown in FIG. 6 is provided, the powertrain 16 may be controlled to establish a regenerative braking mode with two motor/generators functioning as generators with the engine 18 at zero speed. Specifically, when vehicle braking occurs, the engine 18 may be turned off and the motor/generators 60, 70 controlled to function as generators, causing torque on the output member 54 that slows the output member 54 and thereby slows the first axle 12.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain for a vehicle that has a first axle and a second axle; wherein one of the axles is a front axle and the other of the axles is a rear axle, the hybrid powertrain comprising:
an engine;
a stationary member;
an electrically-variable transmission having:
a first and a second interconnected planetary gear set; and
a first and a second motor/generator; wherein the engine, the first motor/generator, the second motor/generator and the first axle are each operatively connectable for rotation with a different member of the first or the second planetary gear set;
an electric drive unit having:
reduction gearing having a plurality of members; and
a third motor/generator; wherein the third motor/generator and the second axle are each operatively connected to a different one of the members of the reduction gearing;
wherein the powertrain is operable in a compound-split operating mode with the engine on and one of the first motor/generator and the second motor/generator functioning as a generator to power the other of the first motor/generator and the second motor/generator which functions as a motor so that the first axle is a drive axle; and wherein the powertrain is operable in a launch mode in which the engine is on, one of the first motor/generator and the second motor/generator functions as a generator, the other of the first motor/generator and the second motor/generator receives a portion of a generated power from said one of the first motor/generator and the second motor/generator to function as a motor providing sufficient torque to prevent the first axle from rotating due to engine torque, and the third motor/generator receives a remaining portion of the generated power from said one of said first motor/generator and said second motor/generator to drive the second axle to launch the vehicle.

2. The hybrid powertrain of claim 1, wherein the powertrain is operable in an input-split operating mode with the engine on and one of the first motor/generator and the second motor/generator functioning as a generator to power the third motor/generator wherein the third motor/generator functions as a motor to drive the second axle; and
wherein the transition between the input-split operating mode and the compound-split operating mode occurs without active clutches or shifting.

3. The hybrid powertrain of claim 1, further comprising:
an input brake configured to connect the engine to the stationary member; wherein the powertrain is operable in a regenerative braking mode when the input brake grounds the engine to the stationary member and the first and second motor/generators function as generators.

4. The hybrid powertrain of claim 3, wherein the input brake is one of a one-way clutch and a selectively engageable clutch.

5. The hybrid powertrain of claim 1, further comprising:
an input brake configured to connect the engine to the stationary member; wherein the powertrain is operable in an electric-only operating mode when the input brake grounds the engine to the stationary member and the first and second motor/generators function as motors.

6. The hybrid powertrain of claim 5, wherein the input brake is one of a one-way clutch and a selectively engageable clutch.

7. The hybrid powertrain of claim 1, wherein the third motor/generator is one of an induction motor and a wound field motor.

8. The hybrid powertrain of claim 1, wherein the reduction gearing is a third planetary gear set, and the hybrid powertrain further comprising:
a selectively engageable clutch operable to selectively connect one of the members of the reduction gearing to the stationary member; wherein the selectively engageable clutch is disengaged during the compound-split operating mode to reduce drag of the electric drive unit on the second axle.

9. The hybrid powertrain of claim 1, wherein the powertrain is operable in an all-wheel drive operating mode with the engine on and one of the first motor/generator and the second motor/generator functioning as a generator to provide power both of the third motor/generator and the other of the first motor/generator and the second motor/generator wherein the third motor/generator and said other of the first motor/generator and the second motor/generator function as motors to drive the second axle and the first axle, respectively.

10. The hybrid powertrain of claim 1, wherein each of the planetary gear sets has a first member, a second member, and a third member; and further comprising:
a first interconnecting member connecting the first member of the first planetary gear set to the first member of the second planetary gear set for common rotation;

a second interconnecting member connecting the second member of the first planetary gear set to the second member of the second planetary gear set for common rotation;

an output member connected for common rotation with the second interconnecting member;

a differential operatively connecting the output member to the first axle;

wherein the first motor/generator is connected to the third member of the first planetary gear set for common rotation;

wherein the second motor/generator is connected to the third member of the second planetary gear set for common rotation;

wherein the engine is connected to the first member of the first planetary gear set for common rotation; and wherein the first axle is operatively connected to the second member of the second planetary gear set via the output member and the differential.

11. The hybrid powertrain of claim 1, wherein the first axle is the front axle and the second axle is the rear axle.

12. A hybrid powertrain for a vehicle that has a first axle and a second axle, the hybrid powertrain comprising:

an engine;

a first and a second motor/generator;

a first and a second planetary gear set;

wherein the engine, the first and the second motor/generators, the first and the second planetary gear sets, and the first axle are interconnected to provide a compound power-split operating mode to drive the first axle;

a third motor/generator;

reduction gearing; and wherein the third motor/generator, the reduction gearing, and the second axle are interconnected so that the engine and one of the first motor/generator and the second motor/generator provide an input-split operating mode to drive the second axle;

wherein the powertrain is operable in an all-wheel drive operating mode with the engine on and one of the first motor/generator and the second motor/generator functioning as a generator to provide power to both the third motor/generator and the other of the first motor/generator and the second motor/generator, wherein the third motor/generator and said other of the first motor/generator and the second motor/generator function as motors to drive the second axle and the first axle, respectively; and wherein the first axle is a front axle and the second axle is a rear axle; and wherein the input-split operating mode is established to launch the vehicle.

13. The hybrid powertrain of claim 12, wherein a transition from the input-split operating mode to the compound-split operating mode occurs without active clutches or shifting.

14. The hybrid powertrain of claim 12, wherein the powertrain is operable in a mode in which the engine is on, one of the first motor/generator and the second motor/generator functions as a generator, the other of the first motor/generator and the second motor/generator receives a portion of a generated power from said one of the first motor/generator and the second motor/generator to function as a motor providing sufficient torque to prevent the first axle from rotating due to engine torque, and the third motor/generator receives a remaining portion of the generated power from said one of said first motor/generator and said second motor/generator to drive the second axle to launch the vehicle.

15. A hybrid powertrain for a vehicle having a first axle and a second axle, the hybrid powertrain comprising:

an engine;

a first and a second motor/generator;

a first and a second planetary gear set;

wherein the engine, the first and the second motor/generators, the first and the second planetary gear sets, and the first axle are interconnected to provide a compound power-split operating mode to drive the first axle without driving the second axle;

a third motor/generator;

a stationary member;

a third planetary gear set having a member connectable to the stationary member;

wherein the third motor/generator, the third planetary gear set, and the second axle are interconnected so that the engine and one of the first motor/generator and the second motor/generator provide an input-split operating mode to drive the second axle without driving the first axle;

a selectively engageable clutch operable to selectively connect the member of the third planetary gear set to the stationary member; wherein the selectively engageable clutch is disengaged during the compound-split operating mode to reduce drag of the third motor/generator and the third planetary gear set on the second axle; and an input brake configured to connect the engine to the stationary member; and wherein the powertrain is operable in an electric-only operating mode when the input brake connects the engine to the stationary member and the first and second motor/generators function as motors.

* * * * *